(12) United States Patent
Whited et al.

(10) Patent No.: US 10,370,527 B2
(45) Date of Patent: Aug. 6, 2019

(54) POLYETHYLENE COMPOSITIONS HAVING LIVING HINGE PROPERTIES

(71) Applicant: Dow Global Technologies LLC, Midland, MI (US)

(72) Inventors: Stephanie M. Whited, South Charleston, WV (US); Mridula Babli Kapur, Lake Jackson, TX (US); Yijian Lin, Manvel, TX (US)

(73) Assignee: Dow Global Technologies LLC, Midland, MI (US)

( * ) Notice: Subject to any disclaimer, the term of this patent is extended or adjusted under 35 U.S.C. 154(b) by 17 days.

(21) Appl. No.: 15/534,383

(22) PCT Filed: Nov. 5, 2015

(86) PCT No.: PCT/US2015/059127
§ 371 (c)(1),
(2) Date: Jun. 8, 2017

(87) PCT Pub. No.: WO2016/093987
PCT Pub. Date: Jun. 16, 2016

(65) Prior Publication Data
US 2017/0342244 A1    Nov. 30, 2017

Related U.S. Application Data

(60) Provisional application No. 62/090,646, filed on Dec. 11, 2014.

(51) Int. Cl.
C08L 23/06    (2006.01)
(52) U.S. Cl.
CPC ......... C08L 23/06 (2013.01); *C08L 2205/025* (2013.01); *C08L 2207/062* (2013.01)
(58) Field of Classification Search
CPC ............... C08L 23/06; C08L 2207/062; C08L 2205/025
See application file for complete search history.

(56) References Cited

U.S. PATENT DOCUMENTS

| | | | |
|---|---|---|---|
| 4,302,565 A | 11/1981 | Goeke et al. | |
| 4,482,687 A | 11/1984 | Noshay et al. | |
| 4,508,842 A | 4/1985 | Beran et al. | |
| 4,990,479 A | 2/1991 | Ishimaru et al. | |
| 5,122,494 A | 6/1992 | Job | |
| 5,290,745 A | 3/1994 | Jorgensen et al. | |
| 6,187,866 B1 | 2/2001 | Jorgensen et al. | |
| 2005/0256271 A1 | 11/2005 | Lustiger et al. | |
| 2008/0221273 A1 † | 9/2008 | Michie | |
| 2013/0331496 A1 † | 12/2013 | Domoy | |
| 2013/0343808 A1 | 12/2013 | Domoy et al. | |
| 2014/0171582 A1 † | 6/2014 | Wang | |
| 2015/0259519 A1 | 9/2015 | Wang et al. | |

FOREIGN PATENT DOCUMENTS

| | | |
|---|---|---|
| JP | 5205322 B2 | 6/2013 |
| WO | 2004/101674 A1 | 11/2004 |
| WO | 2007117520 A2 | 10/2007 |

OTHER PUBLICATIONS

Williams, "Construction of a polyethylene calibration curve for gel permeation chromatography using polystyrene fractions", J. Polym. Sci., Polym. Let., 6, pp. 621-624, 1968.
PCT/US2015/059127, International Search Report and Written Opinion dated Jan. 22, 2016.
PCT/US2015/059127, International Preliminary Report on Patentability dated Jun. 22, 2017.
McAuley et al., "On-Line Inference of Polymer Properties in an Industrial Polyethylene Reactor", AIChE Journal, vol. 37, No. 6 (1991), pp. 825-835.†

† cited by third party

*Primary Examiner* — Nathan M Nutter

(57) ABSTRACT

A polyethylene composition suitable for use in a living hinge component, the composition comprising a first ethylene-based polymer component, the first ethylene-based polymer component has a density of from 0.91.5 g/cc to less than 0.940 g/cc. and a melt index, $I_{2.16}$, of less than 5 g/10 min. and a second ethylene-based polymer component, wherein the composition has an overall density of from 0.945 g/cc to 0.960 g/cc and an overall melt index, $I_{2.16}$, of from 5 g/10 min to 20 g/10 min.

12 Claims, 2 Drawing Sheets

POLYETHYLENE COMPOSITIONS HAVING LIVING HINGE PROPERTIES

TECHNICAL FIELD

Embodiments of the present disclosure generally relate to polyethylene compositions, and more particularly to high density polyethylene compositions suitable for use in living hinge applications.

BACKGROUND

A living hinge is a thin, flexible hinge connecting two relatively rigid parts. It is usually made from the same material as the rigid parts. It may be used to join rigid parts of a container, allowing them to bend along the line of the hinge. Polypropylene (PP) has traditionally dominated the living-hinge dispensing closure market as it is easily processed and has good hinge durability characteristics. Additionally, it is widely available and historically had favorable economics relative to polyethylene when utilized to these ends. These attributes coupled with PP's overall balance of properties make it a frequent choice for living-hinge closure applications, as well as many moulding applications.

In recent years, however, the economics of PP, which have historically been favorable, are no longer as cost effective. Indeed, PP has had increasing costs attributable to industry and market dynamics. The increased price volatility and high costs have led to a reduction of PP capacity in North America. Due to the foregoing, polyethylene now has more favorable economics as compared to PP than it has previously held.

In addition, it has become more desirable to have a closure that is made from the same type of polymer as the bottle to enable recycling of the entire container. Further, polyethylene has not always been a suitable replacement of PP due to poor living hinge durability. That is, polyethylene has not necessarily proven to be mechanically strong enough to last a large number of flexing cycles.

Accordingly, it may be desirable to produce polyethylene compositions having improved processability and/or longer living hinge durability.

SUMMARY

Disclosed in embodiments herein are polyethylene compositions suitable for use in living hinge components. The compositions comprise a first ethylene-based polymer component, the first ethylene-based polymer component has a density of from 0.915 g/cc to less than 0.940 g/cc, and a melt index, $I_{2.16}$, of less than 5 g/10 min, and a second ethylene-based polymer component,
wherein the composition has an overall density of from 0.945 g/cc to 0.960 g/cc and an overall melt index, $I_{2.16}$, of from 5 g/10 min to 20 g/10 min.

Also disclosed in embodiments herein are living hinge components. The living hinge components comprise a polyethylene composition, the composition comprising a first ethylene-based polymer component, the first ethylene-based polymer component has a density of from 0.915 g/cc to less than 0.940 g/cc, and a melt index, $I_{2.16}$, of less than 5 g/10 min, and a second ethylene-based polymer component, wherein the composition has an overall density of from 0.945 g/cc to 0.960 g/cc and an overall melt index, $I_{2.16}$, of from 5 g/10 min to 20 g/10 min.

Additional features and advantages of the embodiments will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing and the following description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
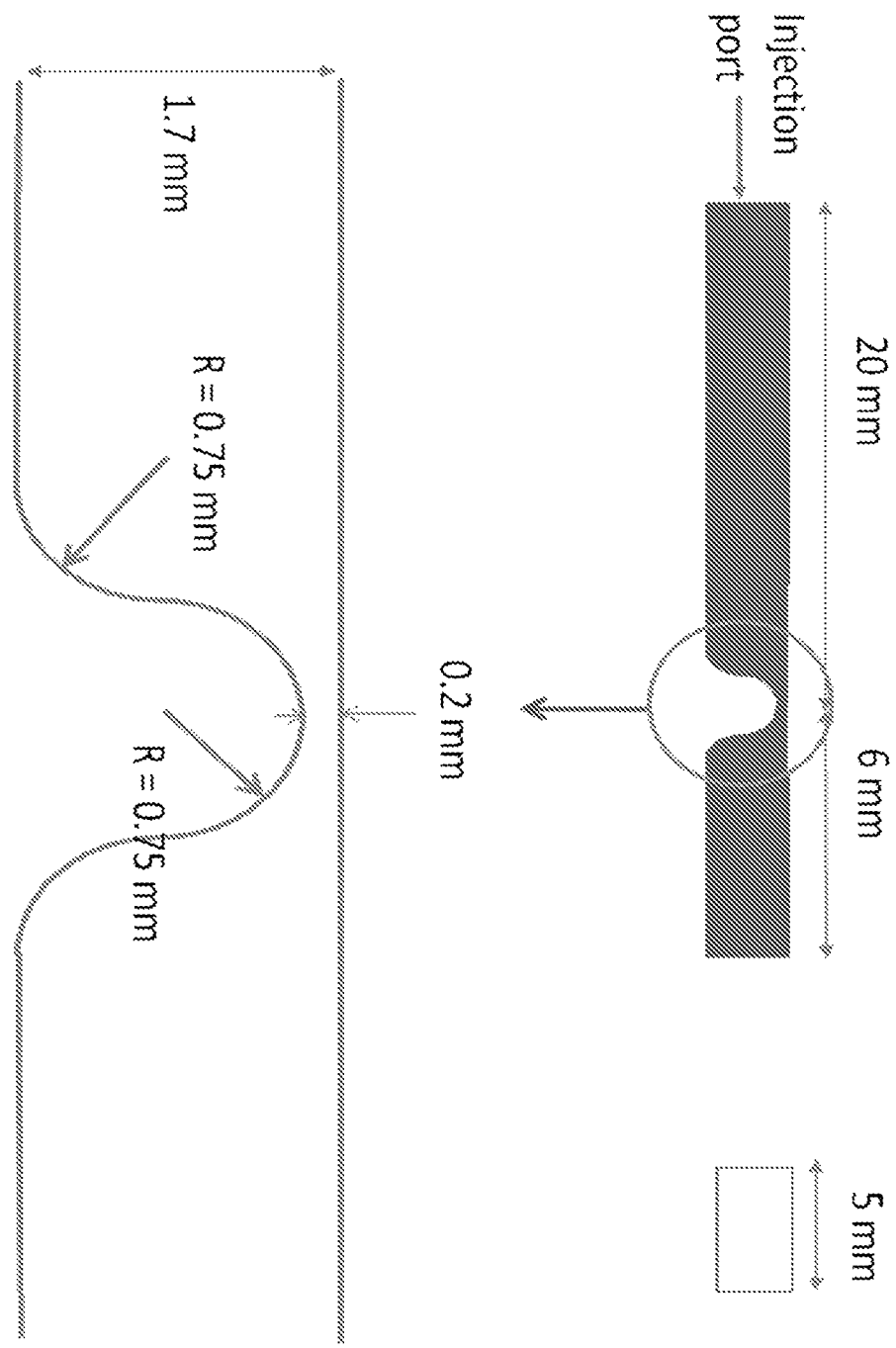
FIG. 1 pictorially depicts the geometry of a living hinge made according to one or more embodiments shown or described herein.

Reference will now be made in detail to embodiments of polyethylene compositions and living hinge components. The polyethylene compositions may be used to form living hinge components. It is noted, however, that this is merely an illustrative implementation of the embodiments described herein. The embodiments are applicable to other technologies that are susceptible to similar problems as those discussed above. For example, the polyethylene compositions described herein may be used in other closure applications, such as, hot-fill and/or aseptic closure applications.

Disclosed is a composition suitable for use in a moulded component, particularly, a living hinge component. The composition includes a first ethylene-based polymer component and a second ethylene-based polymer component. The term "ethylene-based" as used herein means that the polymer component contains more than 50 weight percent of ethylene monomer in polymerized form (based on the total amount of polymerizable monomers) and, optionally, may contain at least one comonomer.

First Ethylene-Based Polymer Component

In embodiments herein, the first ethylene-based polymer component of the composition may be an ethylene-based interpolymer, ethylene homopolymer, ethylene/α-olefin interpolymer, homogeneously branched ethylene-based interpolymer or copolymer, or a heterogeneously branched ethylene-based interpolymer or copolymer. Homogeneously branched interpolymers may be produced, for example, by single-site catalyst systems, and contain a substantially homogeneous distribution of comonomer among the molecules of the interpolymer. Heterogeneously branched interpolymers may typically be produced by Ziegler-Natta type catalysts, and contain a non-homogeneous distribution of comonomer among the molecules of the interpolymer. The comonomer may be an α-olefin. In some embodiments, the first ethylene-based polymer component is an ethylene/α-olefin interpolymer, and further an ethylene/α-olefin copolymer. Trace amounts of impurities, for example, catalyst residues, may be incorporated into and/or within a polymer.

As used herein, "interpolymer" refers to polymers prepared by the polymerization of at least two different types of monomers. The term "interpolymer" can include copolymers, which is used to refer to polymers prepared from two different types of monomers, and polymers prepared from more than two different types of monomers. The term "ethylene/α-olefin interpolymer" refers to an ethylene-based polymer that comprises, in polymerized form, a majority weight percent ethylene (based on the weight of interpolymer), an α-olefin comonomer, and optionally, one or more additional comonomers. "Ethylene/alpha-olefin copolymer" refers to a polymer comprising repeating units derived from ethylene and one alpha-olefin comonomer. "Ethylene homopolymer" refers to a polymer that consists essentially of repeating units derived from ethylene. In some examples, an ethylene homopolymer contains at least 99 percent by weight of ethylene units, at least 99.5% by weight of ethylene units, at least 99.8% by weight of ethylene units, or at least 99.9% by weight of ethylene units.

Suitable α-olefins may include those containing 3 to 20 carbon atoms (C3-C20). In some embodiments, the α-olefin may be a C4-C20 α-olefin, a C4-C12 α-olefin, a C3-C10 α-olefin, a C3-C8 α-olefin, a C4-C8 α-olefin, or a C6-C8 α-olefin. In some embodiments, α-olefins are selected from the group consisting of propylene, 1-butene, 1-pentene, 1-hexene, 4-methyl-1-pentene, 1-heptene, 1-octene, 1-nonene and 1-decene. In other embodiments, α-olefins are selected from the group consisting of propylene, 1-butene, 1-hexene, 4-methyl-1-pentene, and 1-octene. In further embodiments, α-olefins are selected from the group consisting of 4-methyl-1-pentene, 1-butene and 1-hexene.

Exemplary ethylene/α-olefin interpolymers may include, but are not limited to, ethylene/butene-1 (EB) copolymers, ethylene/hexene-1 (EH) copolymers, ethylene/octene-1 (EO) copolymers, ethylene/alpha-olefin/diene modified (EAODM) interpolymers such as ethylene/propylene/diene modified (EPDM) interpolymers and ethylene/propylene/octene terpolymers. In some embodiments, the ethylene/α-olefin interpolymers are selected from the group consisting of EB, EH and EO copolymers. In other embodiments, the ethylene/α-olefin interpolymers are selected from the group consisting of EB and EH copolymers.

In embodiments herein, the density of the first ethylene-based polymer component is from 0.915 g/cc to less than 0.940 g/cc. All individual values and subranges of 0.915 to less than 0.940 g/cc are included and disclosed herein. For example, in some embodiments, the density of the first ethylene-based polymer component is from 0.920 to less than 0.940 g/cc. In other embodiments, the density of the first ethylene-based polymer component is from 0.925 to less than 0.940 g/cc. In further embodiments, the density of the first ethylene-based polymer component is from 0.925 to 0.938 g/cc. Densities disclosed herein for ethylene-based polymers are determined according to ASTM D-792.

In embodiments herein, the melt index, or $I_{2.16}$, of the first ethylene-based polymer component is from 0.01 g/10 min to 5 g/10 min. All individual values and subranges of 0.01 g/10 min to 5 g/10 min are included and disclosed herein. For example, in some embodiments, the melt index of the first ethylene-based polymer component is from 0.01 g/10 min to 4 g/10 min. In other embodiments, the melt index of the first ethylene-based polymer component is from 0.05 g/10 min to 3 g/10 min. In further embodiments, the melt index of the first ethylene-based polymer component is from 0.05 g/10 min to 2.5 g/10 min. Melt index, or $I_{2.16}$, for ethylene-based polymer components is determined according to ASTM D1238 at 190° C., 2.16 kg.

In embodiments herein, the first ethylene-based polymer component may have an overall melt flow ratio ($I_{21.6}/I_{2.16}$) of 15 to 34. All individual values and subranges of 15 to 34 are included and disclosed herein. For example, in some embodiments, the first ethylene-based polymer component may have an overall melt flow ratio of 17 to 34. In other embodiments, the first ethylene-based polymer component may have an overall melt flow ratio of 20 to 34, 22 to 34, or 25 to 33.

Second Ethylene-Based Polymer Component

In embodiments herein, the second ethylene-based polymer component may be an ethylene homopolymer, an ethylene-based interpolymer, ethylene-based copolymer, ethylene/α-olefin interpolymer, or a heterogeneously branched ethylene-based interpolymer or copolymer. The comonomer may be an α-olefin as described herein. In some embodiments, the second ethylene-based polymer component is an ethylene-based interpolymer. In other embodiments, the second ethylene-based polymer component is a polyethylene homopolymer. In further embodiments, the second ethylene-based polymer component is a mixture of a polyethylene homopolymer and an ethylene/α-olefin interpolymer. The second ethylene-based polymer component may be formed using a Ziegler-Natta Catalyst, a single-site catalyst, or combinations thereof.

In embodiments herein, the density of the second ethylene-based polymer component is from 0.955 to 0.980 g/cc. All individual values and subranges of 0.955 to 0.980 g/cc are included and disclosed herein. For example, in some embodiments, the density of the second ethylene-based polymer component is from 0.960 to 0.980 g/cc. In other embodiments, the density of the second ethylene-based polymer component is from 0.965 to 0.980 g/cc. In further embodiments, the density of the second ethylene-based polymer component is from 0.965 to 0.978 g/cc. The density of the second ethylene-based polymer component may be determined from the following equation:

$$\frac{1}{\text{Density }(PE)} = \frac{\text{Weight Fraction }(A)}{\text{Density }(A)} + \frac{\text{Weight Fraction }(B)}{\text{Density }(B)} \quad (I)$$

wherein "A" is the first ethylene-based polymer component, "B" is the second ethylene-based polymer component, and "PE" is the polyethylene composition.

Polyethylene Compositions

In embodiments herein, the compositions may comprise from 5-70 wt. % of the first ethylene-based polymer component. All individual values and subranges of 5-70 wt. % are included and disclosed herein. For example, in some embodiments, the composition may comprise from 15-65 wt. %, from 20-65 wt. %, from 30-65 wt. %, from 35-65 wt. %, or from 35-55 wt. % of the first ethylene-based polymer component. The composition may also comprise from 95-30 wt. % of the second ethylene-based polymer component. All individual values and subranges of 95-30 wt. % are included and disclosed herein. For example, in some embodiments, the composition may comprise from 85-30 wt. %, from 85-40 wt. %, from 75-40 wt. %, from 65-40 wt. %, or from 65-45 wt. % of the second ethylene-based polymer component. The weight percentages are based on the sum weight of the first ethylene-based polymer component and the second ethylene-based polymer component.

The composition has an overall density of from 0.945-0.960 g/cc. All individual values and subranges of 0.945-0.960 g/cc are included and disclosed herein. For example, in some embodiments, the composition may have an overall density of from 0.947-0.960 g/cc, 0.950-0.960 g/cc, 0.953-

0.960 g/cc, or from 0.953-0.958 g/cc. The composition has an overall melt index, $I_{2.16}$, of 5-20 g/10 min. All individual values and subranges of 5-20 g/10 min are included and disclosed herein. For example, in some embodiments, the composition may have an overall melt index of 5-18 g/10 min, 5-15 g/10 min, or 6-15 g/10 min.

The composition may have an overall melt flow ratio ($I_{21.6}/I_{2.16}$) of greater than 35.0. All individual values and subranges of greater than 35.0 are included and disclosed herein. For example, in some embodiments, the composition may have an overall melt flow ratio of greater than 37. In other embodiments, the composition may have an overall melt flow ratio of 35-100, 35-90, 35-80, 35-75, 35-70, 35-60, or 35-50.

In embodiments herein, the composition may have a weight average molecular weight (Mw) of greater than 50,000 g/mole to less than or equal to 150,000 g/mole. All individual values and subranges of greater than 50,000 g/mole to less than or equal to 150,000 g/mole are included and disclosed herein. For example, in some embodiments, the composition may have a weight average molecular weight (Mw) of greater than or equal to 55,000 g/mole to less than or equal to 125,000 g/mole. In other embodiments, the composition may have a weight average molecular weight (Mw) of greater than 55,000 g/mole to less than or equal to 100,000 g/mole. In further embodiments, the composition may have a weight average molecular weight (Mw) of greater than 55,000 g/mole to less than or equal to 90,000 g/mole. The weight average molecular weight may be determined by Gel Permeation Chromatography (GPC).

In embodiments herein, the composition may have a molecular weight distribution (MWD) of 4.0 to 10.0. All individual values and subranges of 4.0 to 10.0 are included and disclosed herein. For example, in some embodiments, the composition may have a MWD of 5.0 to 10.0. In other embodiments, the composition may have a MWD of 6.0 to 10.0. In further embodiments, the composition may have a MWD of 7.0 to 10.0. In even further embodiments, the composition may have a MWD of 7.0 to 9.0. As used herein, MWD refers to the ratio of weight average molecular weight (Mw) to number average molecular weight (Mn), that is, (Mw/Mn). The MWD may be determined by gel permeation chromatography (GPC).

In embodiments herein, the composition may have a viscosity at 100 rad/s and 230° C. of $1\times10^2$ to $5\times10^2$ Pa·s. All individual values and subranges of $1\times10^2$ to $5\times10^2$ Pa·s are included and disclosed herein. For example, in some embodiments, the composition may have a viscosity at 100 rad/s and 230° C. of $1\times10^2$ to $4.75\times10^2$ Pa·s, $1\times10^2$ to $4.5\times10^2$ Pa·s, $1.5\times10^2$ to $4.5\times10^2$ Pa·s, $1.75\times10^2$ to $4.5\times10^2$ Pa·s, $1.85\times10^2$ to $4.5\times10^2$ Pa·s, $1.85\times10^2$ to $4.0\times10^2$ Pa·s, $1.85\times10^2$ to $3.75\times10^2$ Pa·s, $1.85\times10^2$ to $3.5\times10^2$ Pa·s, $1.85\times10^2$ to $3.25\times10^2$ Pa·s, or $1.85\times10^2$ to $3.0\times10^2$ Pa·s. The viscosity may be determined as outlined below.

In embodiments herein, the composition may comprise a Mw of the first ethylene-based polymer component that is greater than the Mw of the second ethylene-based polymer component. In some embodiments, the Mw of the first ethylene-based polymer component is at least twice the Mw of the second ethylene-based polymer component. In other embodiments, the Mw of the first ethylene-based polymer component is at least five times the Mw of the second ethylene-based polymer component. In further embodiments, the Mw of the first ethylene-based polymer component is at least ten times the Mw of the second ethylene-based polymer component.

In embodiments herein, the composition may contain one or more additives. Additives include, but are not limited to, processing aids, acid neutralizers. UV stabilizers, hydro peroxide decomposers, alkyl radical scavengers, hindered amine stabilizers, multifunctional stabilizers, phosphites, antioxidants, process stabilizers, metal de-activators, additives to improve oxidative or chlorine resistance, pigments or colorants, nucleating agents, fatty acid stearates, fluoroelastomers, fillers, and combinations thereof. The composition may comprise from 0.001 to 10 wt. %, based on the weight of the composition, of the one or more additives.

In embodiments herein, the composition can be made by a variety of methods. For example, it may be made by blending or mixing the first ethylene-based polymer component and the second ethylene-based polymer component together. Alternatively, the composition may be made in a single reactor or a multiple reactor configuration, where the multiple reactors may be arranged in series or parallel, and where each polymerization takes place in solution, in slurry, in the gas phase, or a combination of reaction systems (e.g. combination of slurry and gas phase reactor). In some embodiments, a dual reactor configuration is used where the polymer made in the first reactor can be either the first ethylene-based polymer component or the second ethylene-based polymer component. The polymer made in the second reactor may have a density and melt index that the overall density and melt index of the composition is met. Similar polymerization processes are described in, for example, WO 2004/101674A, which is incorporated herein by reference.

In some embodiments herein, a method of manufacturing the compositions described herein may comprise polymerizing a first ethylene-based polymer component, as described herein, in a reactor, and polymerizing a second ethylene-based polymer component, as described herein, in a different reactor, thereby producing a polyethylene composition. The two reactors may be operated in series. In some embodiments, the first ethylene-based polymer component is polymerized in a first reactor, and the second ethylene-based polymer component is polymerized in a second reactor. In other embodiments, the second ethylene-based polymer component is polymerized in a first reactor, and the first ethylene-based polymer component is polymerized in a second reactor.

In some embodiments, the composition is manufactured using at least one Ziegler-Natta catalyst system, either alone, or in combination with a single site catalyst. In other embodiments, the composition is manufactured using multiple reactors in series with a Z-N catalyst being fed to either each reactor or to just the first reactor. In further embodiments, the Z-N catalyst system may be fed into one or two independently-controlled reactors configured sequentially, and operated in solution, slurry or gas phase. In even further embodiments, a conventional mono-modal Ziegler-Natta HDPE was blended with a multi-modal Ziegler-Natta HDPE. Sequential polymerization may be conducted such that fresh catalyst is injected into one reactor, and substantially little active catalyst is carried over from the first reactor into the second reactor. The resulting composition may be characterized as comprising component polymers, each having distinct, unimodal molecular weight distributions. As used herein, "distinct," when used in reference to the molecular weight distribution of the first ethylene-based polymer component and the second ethylene-based polymer component means there are two corresponding molecular weight distributions in the resulting GPC curve of the polyethylene resin. As used herein, "unimodal," when used in reference to the molecular weight distribution of a component polymer of the polyethylene resin means the molecular weight distribution in a GPC curve of the component polymer does not substantially exhibit multiple component polymers.

The Z-N catalyst system includes a procatalyst and a cocatalyst. "Procatalyst" or "precursor", may be used interchangeably herein, and denote a compound comprising a ligand, a transition metal, and optionally, an electron donor. The procatalyst may further undergo halogenation by contacting with one or more halogenating agents. A procatalyst can be converted into a catalyst upon activation. Such catalysts are commonly referred to as Ziegler-Natta catalysts. Suitable Zeigler-Natta catalysts are known in the art and include, for example, the catalysts taught in U.S. Pat. Nos. 4,302,565; 4,482,687; 4,508,842; 4,990,479; 5,122,494; 5,290,745; and, 6,187,866 B 1, the disclosures of which are hereby incorporated by reference. The collection of catalyst components, such as procatalyst(s), cocatalyst(s), is referred to as a catalyst system.

The transition metal compound of the procatalyst composition can comprise compounds of different kinds. The most usual are titanium compounds—organic or inorganic—having an oxidation degree of 3 or 4. Other transition metals such as, vanadium, zirconium, hafnium, chromium, molybdenum, cobalt, nickel, tungsten and many rare earth metals are also suitable for use in Ziegler-Natta catalysts. The transition metal compound is usually a halide or oxyhalide, an organic metal halide or purely a metal organic compound. In the last-mentioned compounds, there are only organic ligands attached to the transition metal.

The procatalyst can have the formula $Mg_d\ Me(OR)_e\ X_f\ (ED)_g$ wherein R is an aliphatic or aromatic hydrocarbon radical having 1 to 14 carbon atoms or COR' wherein R' is a aliphatic or aromatic hydrocarbon radical having 1 to 14 carbon atoms; each OR group is the same or different; X is independently chlorine, bromine or iodine; ED is an electron donor; d is 0.5 to 56; e is 0, 1, or 2; f is 2 to 116; and g is >1 to 1.5(d). Me is a transition metal selected from the group of titanium, zirconium, hafnium and vanadium. Some specific examples of suitable titanium compounds are: $TiCl_3$, $TiCl_4$, $Ti(OC_2H_5)_2Br_2$, $Ti(OC_6H_5)Cl_3$, $Ti(OCOCH_3)Cl_3$, $Ti(acetylacetonate)_2Cl_2$, $TiCl_3(acetylacetonate)$, and $TiBr_4$. $TiCl_3$ and $TiCl_4$ are preferred titanium compounds.

The magnesium compounds include magnesium halides such as $MgCl_2$, $MgBr_2$, and $MgI_2$. Anhydrous $MgCl_2$ is a preferred compound. Other compounds useful in the invention are $Mg(OR)_2$, $Mg(OCO_2Et)$ and MgRCl where R is defined above. About 0.5 to about 56, and preferably about 1 to about 20, moles of the magnesium compounds are used per mole of transition metal compound. Mixtures of these compounds may also be used.

The procatalyst compound can be recovered as a solid using techniques known in the art, such as precipitation of the procatalyst or by spray drying, with or without fillers. Spray drying is a particularly preferred method for recovery of the procatalyst compound. Spray drying is taught in U.S. Pat. No. 5,290,745 and is hereby incorporated by reference. A further procatalyst comprising magnesium halide or alkoxide, a transition metal halide, alkoxide or mixed ligand transition metal compound, an electron donor and optionally, a filler can be prepared by spray drying a solution of said compounds from an electron donor solvent.

The electron donor is typically an organic Lewis base, liquid at temperatures in the range of about 0° C. to about 200° C., in which the magnesium and transition metal compounds are soluble. The electron donor can be an alkyl ester of an aliphatic or aromatic carboxylic acid, an aliphatic ketone, an aliphatic amine, an aliphatic alcohol, an alkyl or cycloalkyl ether, or mixtures thereof, each electron donor having 2 to 20 carbon atoms. Among these electron donors, the preferred are alkyl and cycloalkyl mono-ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. Mono-ether is defined herein as a compound that contains only one ether functional group in the molecule. For ethylene homo and co-polymerization, the most preferred electron donor is tetrahydrofuran. Other examples of suitable electron donors are methyl formate, ethyl acetate, butyl acetate, ethyl ether, dioxane, di-n-propyl ether, dibutyl ether, ethanol, 1-butanol, ethyl formate, methyl acetate, ethyl anisate, ethylene carbonate, tetrahydropyran, and ethyl propionate.

While an excess of electron donor may be used initially to provide the reaction product of transition metal compound and electron donor, the reaction product finally contains about 1 to about 20 moles of electron donor per mole of transition metal compound and preferably about 1 to about 10 moles of electron donor per mole of transition metal compound. The ligands comprise halogen, alkoxide, aryloxide, acetylacetonate and amide anions.

Partial activation of the procatalyst can be carried out prior to the introduction of the procatalyst into the reactor. The partially activated catalyst alone can function as a polymerization catalyst but at greatly reduced and commercially unsuitable catalyst productivity. Complete activation by additional cocatalyst is required to achieve full activity. The complete activation occurs in the polymerization reactor via addition of cocatalyst.

The catalyst procatalyst can be used as dry powder or slurry in an inert liquid. The inert liquid is typically a mineral oil. The slurry prepared from the catalyst and the inert liquid has a viscosity measured at $1\ sec^{-1}$ of at least 500 cp at 20° C. Examples of suitable mineral oils are the Kaydol and Hydrobrite mineral oils from Crompton.

In one embodiment in a polymerization process, the procatalyst undergo in-line reduction using reducing agent(s). The procatalyst is introduced into a slurry feed tank; the slurry then passes via a pump to a first reaction zone immediately downstream of a reagent injection port where the slurry is mixed with the first reagent, as described below. Optionally, the mixture then passes to a second reaction zone immediately downstream of a second reagent injection port where it is mixed with the second reagent (as described below) in a second reaction zone. While only two reagent injection and reaction zones are described above, additional reagent injection zones and reaction zones may be included, depending on the number of steps required to fully activate and modify the catalyst to allow control of the specified fractions of the polymer molecular weight distribution. Means to control the temperature of the catalyst procatalyst feed tank and the individual mixing and reaction zones are provided.

Depending on the activator compound used, some reaction time may be required for the reaction of the activator compound with the catalyst procatalyst. This is conveniently done using a residence time zone, which can consist either of an additional length of slurry feed pipe or an essentially plug flow holding vessel. A residence time zone can be used for both activator compounds, for only one or for neither, depending entirely on the rate of reaction between activator compound and catalyst procatalyst.

The entire mixture is then introduced into the reactor where the activation is completed by the cocatalyst. Additional reactors may be sequenced with the first reactor, however, catalyst is typically only injected into the first of these linked, sequenced reactors with active catalyst transferred from a first reactor into subsequent reactors as part of the polymer thus produced.

The cocatalysts, which are reducing agents, conventionally used are comprised of aluminum compounds, but compounds of lithium, sodium and potassium, alkaline earth metals as well as compounds of other earth metals than aluminum are possible. The compounds are usually hydrides, organometal or halide compounds. Conventionally, the cocatalysts are selected from the group comprising Al-trialkyls, Al-alkyl halides, Al-alkyl alkoxides and Al-alkyl alkoxy halides. In particular, Al-alkyls and Al-alkyl chlorides are used. These compounds are exemplified by trimethylaluminum, triethylaluminum, tri-isobutylaluminum, tri-n-hexylaluminum, dimethylaluminum chloride, diethylaluminum chloride, ethylaluminum dichloride and diisobutylaluminum chloride, isobutylaluminum dichloride and the like. Butyllithium and dibutylmagnesium are examples of useful compounds of other metals.

Other exemplary in-line reducing agents may include aluminum alkyls and aluminum alkyl chlorides of the formula $AlR_xCl_y$, where X+Y=3 and y is 0 to 2 and R is a C1 to C14 alkyl or aryl radical. Such in-line reducing agents include those listed in the following table:

| Reducing Agents | Reducing Agents |
|---|---|
| Diethylaluminum chloride | Triethylaluminum |
| Ethylaluminum dichloride | Trimethylaluminum |
| di-isobutylaluminum chloride | Triisobutylaluminum |
| dimethylaluminum chloride | Tri-n-hexylaluminum |
| Methylaluminum sesquichloride | Tri-n-octylaluminum |
| Ethylaluminum sesquichloride | Dimethylaluminum chloride |

The compositions described herein can be used to manufacture a shaped/moulded article, or one or more components of a shaped/moulded article. Such articles may be single-layer or multi-layer articles, which may be obtained by suitable known conversion techniques, applying heat, pressure, or a combination thereof, to obtain the desired article. Examples of suitable conversion techniques may include, for example, blow-molding, co-extrusion blow-molding, injection molding, injection stretch blow molding, compression molding, extrusion, pultrusion, calendering and thermoforming. Shaped/moulded articles may include, for example, closures, lids, bottles, blow molded articles, injection molded articles, compression molded articles, drip tapes and tubings, geomembranes, films, sheets, fibers, profiles and mouldings.

In embodiments herein, the compositions described herein may be particularly well-suited for use in manufacturing a shaped article or one or more components of a shaped article. In some embodiments, the compositions described herein may be particularly well-suited for use in manufacturing closures or lids. In other embodiments, the compositions described herein may be particularly well-suited for use in manufacturing single-piece closures or lids. In further embodiments, the compositions described herein may be particularly well-suited for use in manufacturing living hinge components.

In some embodiments, a living hinge component may be formed by providing a moulding unit having a mould according to processes known in the art and generally described in Plastic Injection Molding, Volume 1-Manufacturing Process Fundamentals by Douglas M. Bryce, introducing a composition as described herein into the mould, closing the moulding unit, allowing the introduced composition to be maintained in the moulding unit until the termination of a moulding cycle, and opening the moulding unit and removing the component from the mould. Without being bound by theory, it is believed that the compositions described herein exhibit good flowability (e.g., sufficiently high melt index) so as to fill the entire mould in order to fabricate a living hinge component.

The living hinge component may have a thickness wherein the minimum thickness of the hinge portion is in the range of about 0.001 to 0.50 inches, about 0.005 to 0.025 inches, or about 0.01 to 0.014 inches. The living hinge component of the invention may have a ratio of the minimum thickness of the hinge portion to a maximum thickness of the hinged component that is less than or equal to 0.9, less than or equal to 0.5, or less than or equal to 0.3.

In some embodiments, a living hinge component may be formed from the compositions described herein, and may include a filler, such as in amounts of approximately 0.1-80.0 wt. %. Suitable fillers for this purpose may include without limitation glass spheres, calcium carbonate, post-consumer recycle, glass fibers, talc, or any other organic or inorganic filler or combination thereof.

In some embodiments, a living hinge component may be formed from the compositions described herein, and further comprise additional components, such as, polypropylene.

TEST METHODS

Unless otherwise stated, the following test methods are used. All test methods are current as of the filing date of this disclosure.

Density

Measurements are made according to ASTM D792, Method B.

Melt Index

Melt index, or $I_{2.16}$, for ethylene-based polymers is determined according to ASTM D1238 at 190° C., 2.16 kg. Melt Index, or $I_5$, for ethylene-based polymers is determined according to ASTM D1238 at 190° C., 5.0 kg. High load melt index or Flow Index, or $I_{21.6}$, for ethylene-based polymers is determined according to ASTM D1238 at 190° C., 21.6 kg.

Gel Permeation Chromatography

Number- and weight-average molecular weights (Mn and Mw, respectively) of the polymers are determined by Gel Permeation Chromatography (GPC). The chromatographic system is a HT GPC Model PL-220 from Polymer Laboratories (now Agilent) with a differential reflex index detector (dRI). The column and carousel compartments are operated at 140° C. Three Agilent 10-micron Mixed-B columns are used with a solvent of 1,2,4-trichlorobenzene. The samples are prepared at a concentration of 0.1 g of polymer in 50 mL of solvent. Both chromatographic solvent and solvent used to prepare the samples contain 200 ppm of butylated hydroxytoluene (BHT), and both solvent sources are nitrogen sparged. Samples are prepared by agitating lightly for 2 hours at 160° C. The injection volume is 100 μL and the flow rate is 1.0 mL/min.

Data acquisition is performed using a DM 100 module from Polymer Char Inc. Column calibration and sample MW calculation are performed using polymer Char "GPC One" software. Calibration of the GPC column set is performed with narrow polydispersity index polystyrene standards purchased from Polymer Laboratories (now Agilent). 21 polystyrene standards with peak molecular weights from 580 to 8,400,000 g/mol are arranged in 6 "cocktail" mixtures, with at least a decade of separation between individual molecular weights. The polystyrene standard peak molecular weights are converted to polyethylene molecular weights using the following equation (Williams T, Ward I M, *Construction of a polyethylene calibration curve for gel permeation chromatography using polystyrene fractions*. J. Polym. Sci., Polym. Let., 6, 621, 1968.):

$$M_{polyethylene} = A \times (M_{polystyrene})^B,$$

where M is the molecular weight, A has a value of 0.4316, and B is equal to 1.0.

A third order polynomial is used to fit the respective polyethylene-equivalent calibration points obtained from the above equation to their observed elution volumes. The actual polynomial fit is obtained so as to relate the logarithm of polyethylene equivalent molecular weights to the observed elution volumes (and associated powers) for each polystyrene standard.

Number- and weight-average molecular weights are calculated according to the following equations:

$$\overline{Mn} = \frac{\sum_i Wf_i}{\sum_i (Wf_i / M_i)}$$

$$\overline{Mw} = \frac{\sum_i (Wf_i * M_i)}{\sum_i Wf_i}$$

Rheology—Viscosity

Rheological properties are measured using a TA Instruments ARES rheometer. Frequency sweeps are run from 0.1 to 100 rad/s in parallel plate mode at 230° C. in a nitrogen atmosphere. Diameter of the plates is 25 mm. Viscosity at 100 rad/s is reported.

Tensile Properties

Tensile testing is performed according to ASTM D638 at a 2 in/min tensile speed. 2% secant tensile modulus and yield stress are obtained from the tensile test. Flexural testing is performed in accordance with ASTM D790 at a test speed of 0.5 in/min.

Living Hinge Durability

Samples are injection molded into bars using a lab scale injection molding equipment Morgan Press made by Morgan Industries Inc. (Long Beach, Calif., USA). The geometry of the injection molded samples is shown in FIG. 1. The sample bars are 26 mm in length, 5 mm in width and 1.7 mm in thickness. The sample bars have a hinge with a thickness of 0.2 mm. The injection direction is along the bar length direction. Both the barrel temperature and the nozzle temperature are set at 210° C. Mould temperature is set at room temperature. The ram pressure is set at 8,000 psi and the pilot pressure is set at 60 psi. The clamp force is at 12 tons. In each injection cycle, the pressure holding time is 6 seconds, followed by 24 seconds for cooling and 30 seconds for releasing the mould, removing the sample out of the mould, closing the mould, and filling more materials into the barrel. The entire cycle time is 1 minute.

Figure 2:
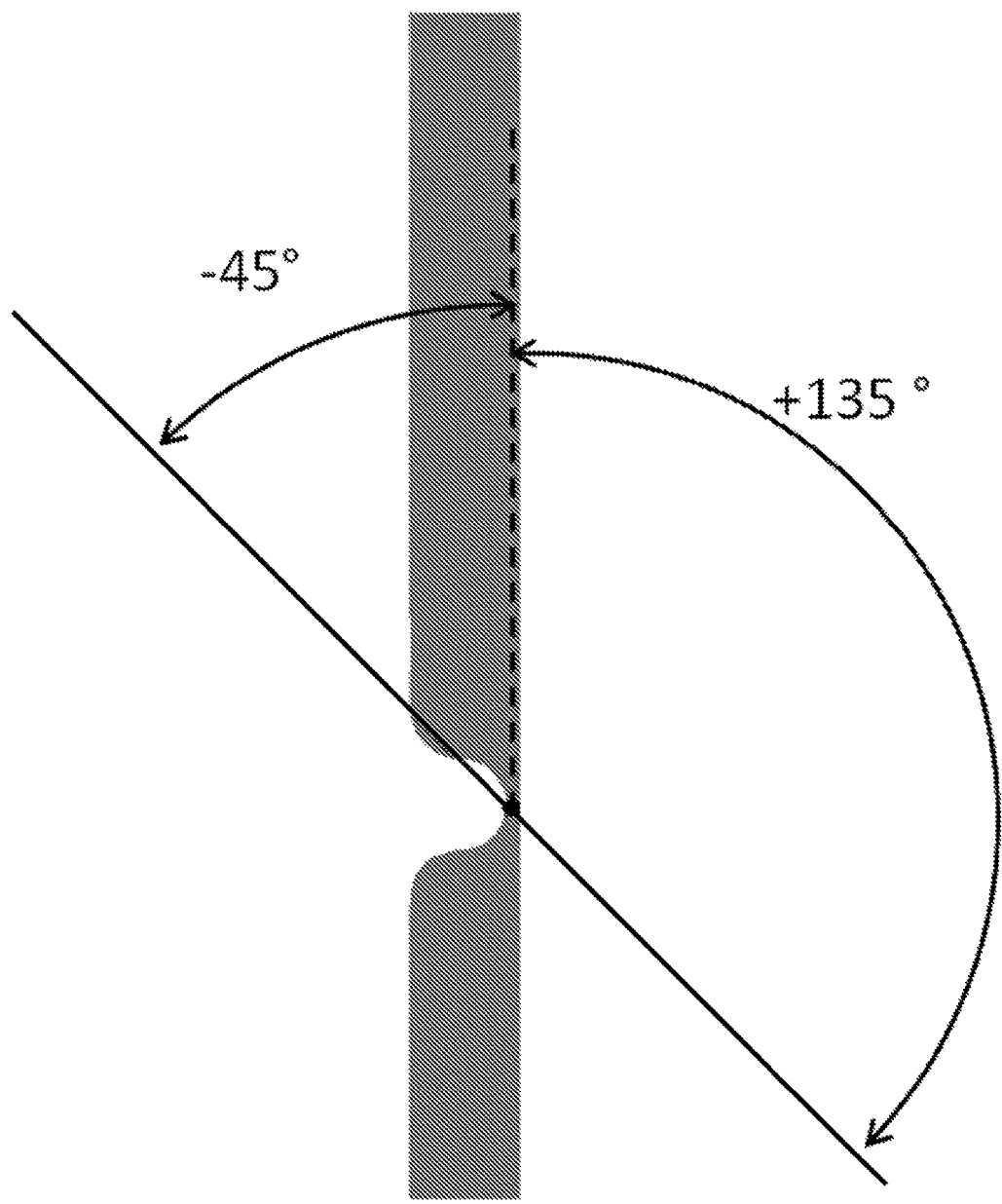
FIG. 2 pictorially depicts the rotation of the hinge durability test on a living hinge made according to one or more embodiments shown or described herein.

The living hinge durability is measured with an automatic hinge durability tester. The 6 mm part of the sample bar is affixed to a stationary holder and the 20 mm part is rotated between −45° to +1350 with the hinge as the center of rotation as shown in FIG. 2. The hinge durability tester has 10 sample holders and 10 sample bars from each resin are tested at the same time. The sample bars are initially held at the −45° position, rotated to the +135° position at a speed of about 0.1 s/180°, held at the +135° position for 5 seconds, rotated back to the −45° position at a speed of about 0.1 s/180°, held at the −45° position for 5 seconds to complete one cycle. The failure cycle for each sample bar hinge is recorded. Failure is indicated by complete breakage of the hinge. All hinge durability testing is conducted at 23° C. The average and standard deviation of the number of cycles to hinge break is calculated for 10 specimens per resin composition The average number of cycles to hinge break is defined as hinge durability.

EXAMPLES

The embodiments described herein may be further illustrated by the following non-limiting examples.

Inventive Example Resins

Inventive resins 1 and 2 were prepared as follows: each resin is an ethylene-based resin produced using a catalyst system comprising a procatalyst, UCAT™ J (commercially available from Univation Technologies, LLC, Houston, Tex.), and a cocatalyst, triethylaluminum (TEAL), in a gas phase polymerization process. The UCAT™ J catalyst was partially activated by contact at room temperature with an appropriate amount of a 40 percent mineral oil solution of tri-n-hexyl aluminum (TNHA). The catalyst slurry was added to a mixing vessel. While stirring, a 40 percent mineral oil solution of tri-n-hexyl aluminum (TNHA) was added at ratio of 0.17 moles of TNHA to mole of residual tetrahydrofuran (THF) in the catalyst and stirred for at least 1 hour prior to use. Ethylene (C2) and optionally, 1-hexene (C6) were polymerized in two fluidized bed reactors. Each polymerization was continuously conducted, after equilibrium was reached, under the respective conditions, as shown below in Table 1. Polymerization was initiated in the first reactor by continuously feeding the catalyst and cocatalyst (trialkyl aluminum, specifically tri ethyl aluminum or TEAL) into a fluidized bed of polyethylene granules, together with ethylene, hydrogen, and, optionally, 1-hexene. The resulting polymer, mixed with active catalyst, was withdrawn from the first reactor, and transferred to the second reactor, using second reactor gas as a transfer medium. The second reactor also contained a fluidized bed of polyethylene granules. Ethylene and hydrogen were introduced into the second reactor, where the gases came into contact with the polymer and catalyst from the first reactor. Inert gases, nitrogen and isopentane, made up the remaining pressure, in both the first and second reactors. In the second reactor, the cocatalyst (TEAL) was again introduced. The final product blend was continuously removed. Table 1 lists polymerization conditions for inventive resins 1 & 2.

Comparative Example Resins

Comparative Resin A is a high density polyethylene resin commercially available as CONTINUUM™ DMDA-1250 from The Dow Chemical Company (Midland, Mich.) and has a density of 0.955 g/cc and a melt index, $I_{2.16}$, of 1.5 g/10 min. Comparative Resin B is a high density polyethylene resin commercially available as DMDA 8940 from The Dow Chemical Company (Midland, Mich.) and has a density of 0.951 g/cc and a melt index, $I_{2.16}$, of 44.0 g/10 min. Comparative Resin C is a blend of 25% of CONTINUUM™ DMDA-1250 and 75% of DMDA 8940, and has a measured blend density of 0.952 g/cc, a measured melt index, $I_{2.16}$, of 16.5 g/10 min, and a measured melt flow ratio ($I_{21.6}/I_{2.16}$) of 34.9.

TABLE 1

| | Process Conditions | | | |
|---|---|---|---|---|
| | Inventive Resin 1 | | Inventive Resin 2 | |
| Reactor | #1 | #2 | #1 | #2 |
| Catalyst | UCAT ™ J | | UCAT ™ J | |
| Temperature, ° C. | 90.0 | 100.0 | 90.0 | 100.0 |
| Pressure, psig | 347 | 397 | 347 | 398 |
| C2 Partial Pressure, psi | 33.5 | 101.9 | 31.3 | 102.6 |
| H2/C2 Molar Ratio | 0.240 | 1.80 | 0.163 | 1.80 |
| C6/C2 Molar Ratio | 0.061 | 0.004 | 0.051 | 0.004 |
| IC5% | 7.993 | 3.051 | 7.972 | 2.844 |
| Cat Feed Rate, cc/hr | 8.8 | | 9.0 | |
| Cocatalyst | 2.5% TEAL | 2.5% TEAL | 2.5% TEAL | 2.5% TEAL |
| Cocat. Feed Rate, cc/hr | 368 | 152 | 374 | 150 |
| Production Rate, lb/hr | 28.1 | 33.8 | 29.3 | 35.4 |
| Bed Weight, lbs | 88 | 161 | 86 | 153 |
| Split % | 45.4 | 54.6 | 45.3 | 54.7 |
| RESIN PROPERTIES | | | | |
| Melt Index, g/10 min $I_{2.16}$ | 1.39 | 14.1 | 0.49 | 7.7 |
| Melt Index, g/10 min $I_5$ | 4.16 | 45.3 | 1.49 | 26.4 |
| Melt Index, g/10 min $I_{21.6}$ | 39.0 | 524 | 14.4 | 346 |
| Density, g/cc | 0.9373 | 0.9563 | 0.9361 | 0.9561 |
| MFR ($I_{21.6}/I_{2.16}$) | 28.1 | 37.1 | 29.1 | 44.9 |
| MFR ($I_{21.6}/I_5$) | 9.4 | 11.6 | 9.7 | 13.1 |

The measured properties of the inventive and comparative resins are reported in Tables 2.

TABLE 2

| | Resin Properties | | | | | |
|---|---|---|---|---|---|---|
| | Tensile modulus, 2% secant (ksi) | Tensile yield stress (ksi) | Flexural modulus, 2% secant (ksi) | Viscosity @ 100 rad/s and 230° C. (Pa · s) | Mw (g/molw) | Mw/Mn |
| Inventive Resin 1 | 76.1 | 3.97 | 156 | 191 | 66,691 | 7.3 |
| Inventive Resin 2 | 74.9 | 3.94 | 161 | 282 | 79,392 | 8.4 |
| Comparative Resin A | — | — | — | 706 | 120,365 | 11.1 |
| Comparative Resin B | — | — | — | 93 | 45,317 | 4.2 |
| Comparative Resin C | 72.4 | 3.80 | 147 | 173 | 64,669 | 6.5 |

The measured durability of living hinges fabricated from the inventive and comparative resins are reported in Tables 3. Hinge sample 1 is made from inventive resin 1. Hinge sample 2 is made from inventive resin 2. Hinge sample B is made from comparative resin B. Hinge sample C is made from comparative resin C. Due to the low melt index of comparative resin A, a hinge sample could not be fabricated using the injection molding process as the resin has poor flowability into the mould. All hinge samples are made according to the procedure described in the Living Hinge Durability test method.

TABLE 3

| | Living Hinge Durability Test Results | |
|---|---|---|
| | Number of cycles to break (count) | |
| | Average | Standard deviation |
| Hinge 1 | 704 | 49 |
| Hinge 2 | 1668 | 41 |
| Hinge B | 117 | 16 |
| Hinge C | 553 | 22 |

The results show that the inventive example resin compositions have good processability, and furthermore, living hinges fabricated from the inventive example resin compositions are more durable (i.e., have a high number of cycles to break) than those fabricated from the comparative example resin compositions.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, if any, including any cross-referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

We claim:

1. A polyethylene composition suitable for use in a living hinge component, the composition comprising:
    a first ethylene-based polymer component, the first ethylene-based polymer component has a density of from 0.915 g/cc to less than 0.940 g/cc, a melt index, $I_{2.16}$, of less than 5 g/10 min, and an overall melt flow ratio ($I_{21.6}/I_{2.16}$) of 15 to 34; and
    a second ethylene-based polymer component;
    wherein the composition has an overall density of from 0.945 g/cc to 0.960 g/cc and an overall melt index, $I_{2.16}$, of from 5 g/10 min to 20 g/10 min.

2. The composition of claim 1, wherein the composition comprises from 5 wt. % to 70 wt. % of the first ethylene-based polymer component, and from 30 wt. % to about 95 wt. % of the second ethylene-based polymer component.

3. The composition of claim 1, wherein the composition has a melt flow ratio, $I_{21.6}/I_{2.16}$, of greater than 35.0.

4. The composition of claim 1, wherein the second ethylene-based polymer component has a density of 0.955 g/cc to 0.980 g/cc, wherein the density is determined according to the equation:

$$\frac{1}{\text{Overall Composition Density}} = \frac{\text{Wt. \% of 1st ethylene-based polymer}}{\text{Density of 1st ethylene-based polymer}} + \frac{\text{Wt. \% of 2nd ethylene-based polymer}}{\text{Density of 2nd ethylene-based polymer}}.$$

5. The composition of claim 1, wherein the composition has a molecular weight distribution of 4.0 to 10.0.

6. The composition of claim 1, wherein the composition is prepared by in-situ interpolymerization using at least two reactors.

7. The composition of claim 6, wherein the at least two reactors are operated in series.

8. A living hinge component comprising a polyethylene composition, the composition comprising:
    a first ethylene-based polymer component, the first ethylene-based polymer component has a density of from 0.915 g/cc to less than 0.940 g/cc, a melt index, $I_{2.16}$, of less than 5 g/10 min, and an overall melt flow ratio ($I_{21.6}/I_{2.16}$) of 15 to 34; and
    a second ethylene-based polymer component;
    wherein the composition has an overall density of from 0.945 g/cc to 0.960 g/cc and an overall melt index, $I_{2.16}$, of from 5 g/10 min to 20 g/10 min.

9. The component of claim 8, wherein the composition comprises from 5 wt. % to 70 wt. % of the first ethylene-based polymer component, and from 30 wt. % to about 95 wt. % of the second ethylene-based polymer component.

10. The component of claim 8, wherein the composition has a melt flow ratio, $I_{21.6}/I_{2.16}$, of greater than 35.

11. The component of claim 8, wherein the second ethylene-based polymer component has a density of 0.955 g/cc to 0.980 g/cc, wherein the density is determined according to the equation:

$$\frac{1}{\text{Overall Composition Density}} = \frac{\text{Wt. \% of 1st ethylene-based polymer}}{\text{Density of 1st ethylene-based polymer}} + \frac{\text{Wt. \% of 2nd ethylene-based polymer}}{\text{Density of 2nd ethylene-based polymer}}.$$

12. The component of claim 8, wherein the composition has a molecular weight distribution of 4.0 to 10.0.

* * * * *